United States Patent [19]
Walker et al.

[11] Patent Number: 5,968,144
[45] Date of Patent: Oct. 19, 1999

[54] SYSTEM FOR SUPPORTING DMA I/O DEVICE USING PCI BUS AND PCI-PCI BRIDGE COMPRISING PROGRAMMABLE DMA CONTROLLER FOR REQUEST ARBITRATION AND STORING DATA TRANSFER INFORMATION

[75] Inventors: Gary Walker, Phoenix; James J. Jirgal, Chandler; Rishi Nalubola, Phoenix; Franklyn H. Story, Chandler, all of Ariz.

[73] Assignee: VLSI Technology, Inc., San Jose, Calif.

[21] Appl. No.: 08/673,243

[22] Filed: Jun. 27, 1996

[51] Int. Cl.$^6$ .................................................. G06F 13/28
[52] U.S. Cl. .............................. 710/28; 710/22; 710/27
[58] Field of Search .................................... 395/842, 848, 395/847, 856, 306, 308, 309, 281, 500; 364/242.3

[56] References Cited

U.S. PATENT DOCUMENTS

| | | | |
|---|---|---|---|
| 5,555,383 | 9/1996 | Elazar et al. ............................ | 395/306 |
| 5,590,377 | 12/1996 | Smith ...................................... | 395/842 |
| 5,598,539 | 1/1997 | Gephardt et al. ....................... | 395/821 |
| 5,623,700 | 4/1997 | Parks et al. ............................. | 395/873 |
| 5,632,021 | 5/1997 | Jennings et al. ........................ | 395/309 |
| 5,649,161 | 7/1997 | Andrade et al. ........................ | 395/494 |
| 5,729,762 | 3/1998 | Kardach et al. ........................ | 395/842 |
| 5,734,847 | 3/1998 | Garbus et al. .......................... | 395/308 |
| 5,734,850 | 3/1998 | Kenny et al. ........................... | 395/309 |

*Primary Examiner*—Thomas C. Lee
*Assistant Examiner*—Chien Yuan
*Attorney, Agent, or Firm*—Harry M. Weiss; Jeffrey D. Moy; Harry M. Weiss & Associates, P.C.

[57] ABSTRACT

The present invention relates to a system and method for supporting DMA I/O devices. A PCI-PCI bridge is provided to support DMA I/O devices on the PCI bus. Through the use of two signal lines and a serial link, DMA transfers may be accomplished over the PCI bus. A PCI-ISA dock bridge is also provided to allow the system to support DMA I/O devices and ISA masters (i.e., any device including DMA I/O devices on the ISA bus that generates ISA cycles) on the ISA bus.

14 Claims, 1 Drawing Sheet

5,968,144

SYSTEM FOR SUPPORTING DMA I/O DEVICE USING PCI BUS AND PCI-PCI BRIDGE COMPRISING PROGRAMMABLE DMA CONTROLLER FOR REQUEST ARBITRATION AND STORING DATA TRANSFER INFORMATION

BACKGROUND OF THE INVENTION

1. Field of the Invention

This invention relates to computer systems and, more specifically, to a system and method which will support ISA-derived Direct Memory Access (DMA) Input/Output (I/O) devices without requiring an Industry Standard Architecture (ISA) bus and, if an ISA bus is provided, the system and method will support DMA I/O devices and ISA Masters on the ISA bus.

2. Description of the Prior Art

The Peripheral Component Interconnect (PCI) bus does not provide any direct support for DMA devices ISA or otherwise. This is a problem for many types of machines, particularly International Business Machines (IBM) Personal Computer (PC) AT compatible machines, which use a specific DMA programming model. In past IBM PC/AT designs, DMA I/O devices were only supported if the DMA devices were connected to an ISA bus. The ISA bus provided direct support for DMA I/O devices through a pair of signal lines DRQ/DACK#. However, these signal lines were not easily useable by DMA devices which do not attach to the ISA bus but require software compatibility.

Therefore, a need existed to provide a system and method for supporting DMA I/O devices that are coupled to a PCI bus. This will allow IBM PC/AT machines to support DMA I/O devices without requiring an ISA bus. However, if an ISA bus is provided, the system and method will still support DMA I/O devices and ISA Masters on the ISA bus.

SUMMARY OF THE INVENTION

In accordance with one embodiment of the present invention, it is an object of the present invention to provide a system and method for supporting DMA I/O devices.

It is another object of the present invention to provide a system and method for supporting DMA I/O devices without requiring an ISA bus.

It is still another object of the present invention to provide a system and method for supporting DMA I/O devices without requiring an ISA bus however, if an ISA bus is provided, the system and method will still support DMA I/O devices and ISA Masters on the ISA bus.

BRIEF DESCRIPTION OF THE PREFERRED EMBODIMENTS

In accordance with one embodiment of the present invention, a system for supporting a Direct Memory Access (DMA) Input/Output (I/O) device is disclosed. The system is comprised of a plurality of components one of which is a PCI bus. Peripheral controller means having the DMA I/O device incorporated therein is coupled to the PCI bus for signalling a DMA request from the DMA I/O device. PCI-PCI bridge means are coupled to the peripheral controller means for decoding the DMA request from the DMA I/O device and for initiating PCI bus access for transferring data to and from the DMA I/O device. CPU means are provided for programming the PCI-PCI bridge means with information concerning the data transfer. System controller means are coupled to the CPU means and to the peripheral controller means for translating CPU cycles to PCI master cycles. First signal line means are coupled to the peripheral controller means and to the PCI-PCI bridge means for signalling the PCI-PCI bridge means when a valid DMA transfer has been requested by the DMA I/O device. Second signal line means are coupled to the peripheral controller means and to the PCI-PCI bridge means for signalling the peripheral controller means when the PCI-PCI bridge means acknowledges the valid DMA transfer has been granted. Third signal line means are coupled to the peripheral controller means and to the PCI-PCI bridge means for transmitting real time status of a DMA request signal (DRQ) from the DMA I/O device. The system may further be comprised of an ISA bus. PCI-ISA dock bridge means are coupled to the ISA bus and to the PCI-PCI bridge means for translating PCI cycles to ISA cycles. An ISA DMA I/O device is coupled to the ISA bus. First signal line means are coupled to the PCI-ISA dock bridge means and to the PCI-PCI bridge means for signalling the PCI-PCI bridge means when a valid DMA transfer has been requested by the ISA DMA I/O device via the PCI-ISA dock bridge means. Second signal line means are coupled to the PCI-ISA dock bridge means and to the PCI-PCI bridge means for signalling the PCI-ISA dock bridge means when the PCI-PCI bridge means acknowledges the DMA transfer has been granted. Third signal line means are coupled to the PCI-ISA dock bridge means and to the PCI-PCI bridge means for signalling real time status of a DMA request signal (DRQ) from the ISA DMA I/O device. ISA bus mastering means are also coupled to the PCI-ISA dock bridge means for issuing a DMA request on the ISA bus.

In accordance with another embodiment of the present invention, a method for performing DMA transfers is disclosed. The method comprises the steps of: providing a system for supporting DMA I/O devices comprising: a PCI bus; peripheral controller means having the DMA I/O device incorporated therein and coupled to the PCI bus for signalling a DMA request from the DMA I/O device; PCI-PCI bridge means coupled to the peripheral controller means for decoding the PCI bus request from the DMA I/O devices and for initiating PCI bus access for transferring data to and from the DMA I/O devices; CPU means for programming the PCI-PCI bridge means with information concerning the data transfer; system controller means coupled to the CPU means and to the peripheral controller means for translating CPU cycles to PCI master cycles; first signal line means coupled to the peripheral controller means and to the PCI-PCI bridge means for signalling the PCI-PCI bridge means when a valid DMA transfer has been requested by the DMA I/O device; second signal line means coupled to the peripheral controller means and to the PCI-PCI bridge means for signalling the peripheral controller means when the PCI-PCI bridge means acknowledges the valid DMA transfer has been granted; and third signal line means coupled to the peripheral controller means and to the PCI-PCI bridge means for transmitting real time status of a DMA request signal (DRQ) from the DMA I/O device. The method further comprises the steps of: programming the PCI-PCI bridge means by the CPU with the information concerning the transfer of data; signalling the PCI-PCI bridge means when the valid DMA transfer has been requested by the DMA I/O device; signalling the peripheral controller means when the PCI-PCI bridge means acknowledges the valid DMA transfer has been granted; signalling the PCI-PCI bridge means a current status of a DMA request signal (DRQ) from the DMA device; and transferring the data.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

Figure 1:
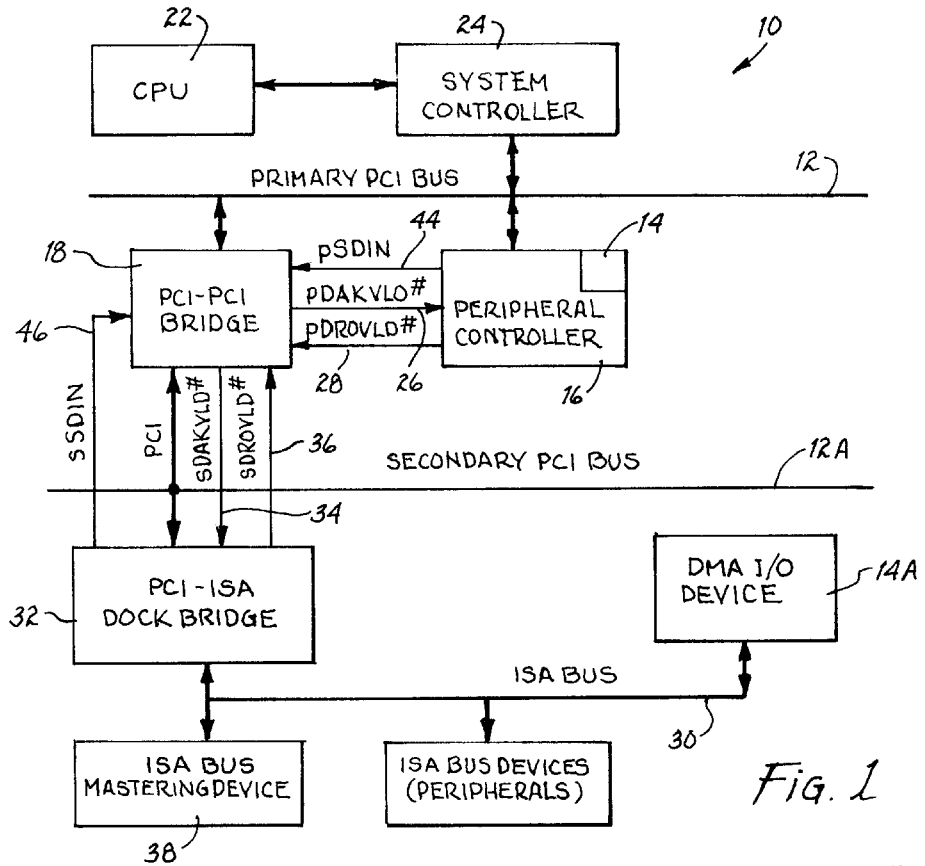
FIG. 1 is a simplified functional block diagram of the system of the present invention.

Referring to FIG. 1, a system for supporting DMA I/O devices 10 (hereinafter system 10) is shown. The system 10 is comprised of a DMA I/O device 14. The DMA I/O device 14 transfers data to and receives data from the memory of the system 10. A Peripheral Component Interconnect (PCI) bus 12 is also provided. The PCI bus 12 will have at least one DMA I/O device 14 coupled thereto. The transfer of data to and from the DMA I/O devices 14 occurs over the PCI bus 12. In the preferred embodiment of the present invention, the DMA I/O device 14 is contained within a peripheral controller 16.

The peripheral controller 16 is directly coupled to the PCI bus 12. The peripheral controller 16 is used for signalling a PCI bus request from the DMA I/O device 14 that is contained within the peripheral controller 16. It should be noted that an additional peripheral controller 16 containing a DMA I/O device 14 could be coupled to a secondary PCI bus 12A in order to signal a PCI bus request from the DMA I/O device 14 that is contained within the peripheral controller 16 located on the secondary PCI bus 12A.

Figure 2:
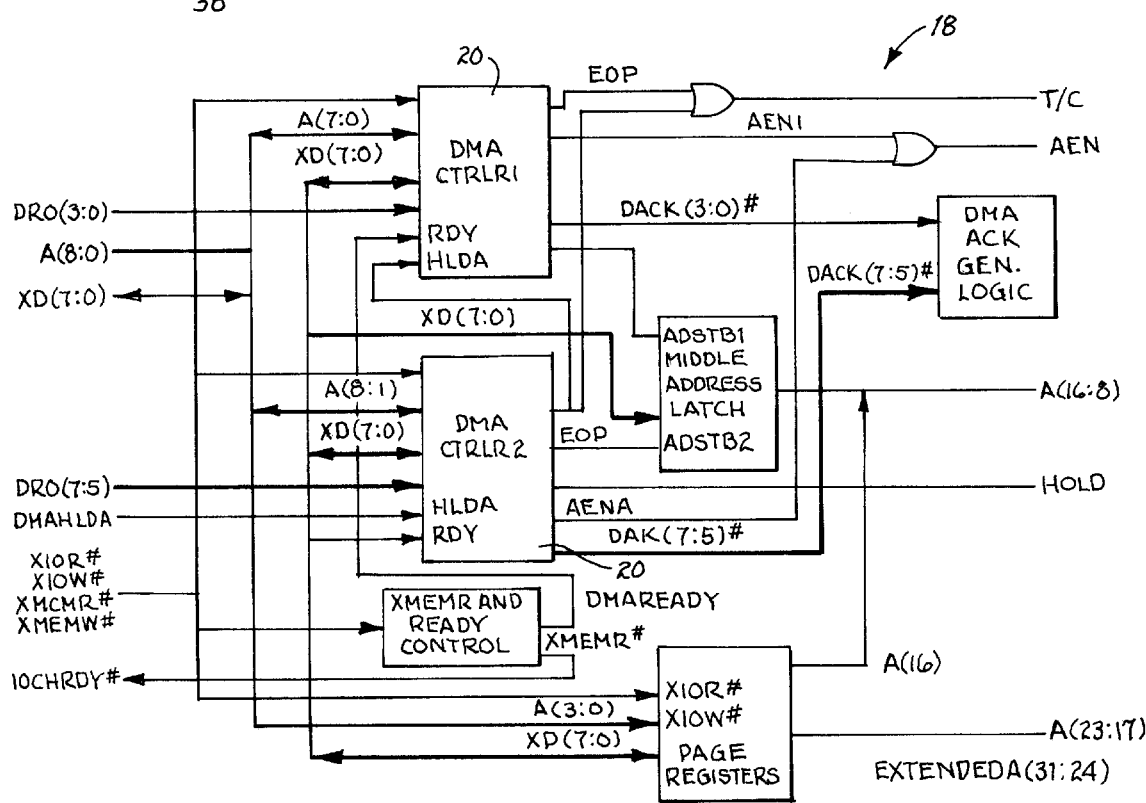
FIG. 2 is a simplified functional block diagram of a PCI-PCI bridge used in the system depicted in FIG. 1.

A PCI-PCI bridge 18 is directly coupled to the peripheral controller 16. The PCI-PCI bridge 18 is used for decoding the DMA request from the DMA I/O device 14 and for initiating PCI bus 12 access for transferring data to and from the DMA I/O device 14. In the preferred embodiment of the present invention, the PCI-PCI bridge 18 is comprised of programmable DMA controllers 20 (see FIG. 2). The DMA controllers 20 generate DMA cycles which are translated to PCI memory or PCI I/O cycles.

Before a DMA transfer, the DMA controllers 20 are programmed with information concerning the transfer of data. Information programmed into the DMA controllers 20 include: the memory address from which the DMA I/O device 14 will receive data from or write data to, the amount of data to transfer, the direction the data will be transferred (i.e., DMA I/O device 14 to memory or memory to DMA I/O device 14), and the mode in which the data should be transferred (i.e., single, demand, or block mode). The DMA controllers 20 are also used for arbitrating between all DMA requests in the system 10 and for designating which PCI bus to use (i.e., primary PCI bus 12 or secondary PCI bus 12A).

The system 10 is also comprised of a Central Processing Unit (CPU) 22. The CPU 22 is coupled to the PCI bus 12 for programming the DMA controllers 20 with information concerning the data transfer. However, the CPU 22 is not able to directly program the DMA controllers 20. For this reason, a system controller 24 is provided. The system controller 24 is coupled to the CPU 22 and to the peripheral controller 16. The system controller 24 is used for translating CPU cycles to PCI master cycles.

When a DMA transfer has been requested by the DMA I/O device 14, the peripheral controller 16 translates the request into a serial message to the PCI-PCI bridge 18 in order to notify the PCI-PCI bridge 18 of the upcoming DMA transfer. This serial message is transferred over a first signal line 44 which is coupled to the peripheral controller 16 and to the PCI-PCI bridge 18. The first signal line 44 being used for signalling the PCI-PCI bridge 18 of the upcoming DMA transfer. A second signal line 26 is also coupled to the peripheral controller 16 and to the PCI-PCI bridge 18. The second signal line 26 is used for signalling the DMA I/O device 14 in the peripheral controller 16 when the PCI-PCI bridge 18 acknowledges that a valid DMA transfer has been granted. A third signal line 28 is also coupled to the peripheral controller 16 and to the PCI-PCI bridge 18. The third signal line 28 is used for signalling the PCI-PCI bridge 18 that the DMA I/O device 14 that originally requested the DMA transfer is now participating in the transfer. The DMA I/O device 14 will keep this signal asserted over the third signal line 28 for as long as the DMA I/O device 14 has data to transfer.

The system 10 is also able to support a DMA I/O device 14A and Industry Standard Architecture (ISA) masters (i.e., any device 38 on the ISA bus 30 that generates ISA cycles) on the ISA bus 30. In accordance with this embodiment of the system 10, a Peripheral Component Interconnect to Industry Standard Architecture (PCI-ISA) dock bridge 32 is provided. The PCI-ISA dock bridge 32 is coupled to the PCI-PCI bridge 18. The PCI-ISA dock bridge 32 is used for forwarding ISA Master cycles which originate on the ISA bus 30 to the PCI bus 14 and for forwarding PCI cycles which originate on the PCI bus 12 to the ISA bus 30.

A first signal line 46 is coupled to the PCI-ISA dock bridge 32 and to the PCI-PCI bridge 18. The first signal line 46 is used for signalling the PCI-PCI bridge 18 when a valid DMA transfer has been requested by the DMA I/O device 14A on the ISA bus 30. A second signal line 34 is also coupled to the PCI-ISA dock bridge 32 and to the PCI-PCI bridge 18. The second signal line 36 is used for signalling the PCI-ISA dock bridge 32 when the PCI-PCI bridge 18 acknowledges that the DMA transfer has been granted. A third signal line 36 is also coupled to the PCI-ISA dock bridge 32 and to the PCI-PCI bridge 18. The third signal line 36 is used for signalling the PCI-PCI bridge 18 that the DMA I/O device 14A that originally requested the DMA transfer is now participating in the transfer. This signal will be asserted over the third signal line 28 for as long as the DMA I/O device 14A has data to transfer.

An ISA bus mastering device 38 may also be provided in the system 10. The ISA bus mastering device 38 is coupled to the PCI-ISA dock bridge 32. The ISA bus mastering circuit 38 is used for initiating ISA cycles on the ISA bus 30. The ISA cycles are then sent to the PCI-ISA dock bridge 32 which will then translate the ISA cycles into PCI cycles.

PCI Bus Initiated Accesses

The PCI-PCI bridge 18 provides DMA support for the DMA I/O device 14 in the peripheral controller 16 through the use of two control signals and a serial link. DMA I/O devices 14 on both PCI busses 12 (i.e., primary PCI bus 12 and secondary PCI bus 12A) use their respective busses' serial link to transmit a DMA request (DRQ). The signal lines pDAKVLD# 26 and pDRQVLD# 28 provide information on the primary PCI bus regarding the real-time status of the DMA controller's 20 active DMA acknowledge signals (DACK#) and the DMA I/O devices' DMA request signals (DRQ) respectively. The signal lines sDAKVLD# 34 and sDRQVLD# 36 provide information on the secondary PCI bus regarding the real-time status of the DMA controller's 20 active DACK# signals and the DMA I/O devices' DRQ signals respectively.

Before a DMA transfer, the CPU 22 programs the DMA controllers 20 (FIG. 2) of the PCI-PCI bridge 18 that the DMA I/O device 14 will use when transferring data. The DMA I/O device 14 requests a DMA transfer by transmitting its DRQ state using a serial link 44 or 46. Note that the serial link 44 is used for DMA request on the primary PCI bus 12 and serial link 46 is used for DMA request on the secondary PCI bus 12A. The remainder of the discussion on PCI bus initiated access will be in regards to a DMA I/O device 14 located on the primary PCI bus 12.

Once the DMA controller 20 receives a DRQ signal, the DMA controller 20 of the PCI-PCI bridge 18 arbitrates between all DMA requests in the system 10. The DMA controller 20 then requests possession of both PCI busses 12 and 12A. Once the PCI interfaces transmit their respective grants, an internal grant asserts to the DMA controller 20. The DMA controller 20 then begins a DMA cycle by asserting a DACK# signal.

Upon a DACK# signal assertion, the PCI-PCI bridge 18 presents the encoded state of the DACK#, transfer mode, and the terminal count (TC) signals on the address lines of the PCI bus 14 associated with the serial link on which the granted DMA cycle was requested and asserts a pDAKVLD# signal. After the PCI-PCI bridge 18 asserts pDAKVLD#, the PCI-PCI bridge 18 samples pDRQVLD#. The requesting DMA I/O device 14 acknowledges its DACK# code by asserting pDRQVLD# within two PCI clock cycles after the pDAKVLD# assertion. The requesting DMA I/O device 14 keeps pDRQVLD# asserted until the requesting DMA I/O device 14 requires no more DMA cycles. The requesting DMA I/O device 14 deasserts pDRQVLD# before the DMA I/O device 14 asserts PCI signal TRDY# if the DMA I/O device 14 cannot immediately accommodate another DMA cycle. The DMA I/O device 14 also changes the state of pDRQVLD# in response to pDAKVLD# being driven high.

After the pDRQVLD#/pDAKVLD# handshake, the PCI-PCI bridge 18 samples the states of the DMA controller's 20 I/O read (IOR#) signal and the memory read (MEMR#) signal. If the MEMR# signal is asserted, a PCI memory read cycle begins. The PCI-PCI bridge 18 generates a PCI cycle to read the data from the memory device. The PCI-PCI bridge 18 stores the data and then generates a PCI I/O cycle to write the data to the DMA I/O device 14. This memory read-I/O write sequence continues until a TC occurs or pDRQVLD# from the DMA I/O device 14 deasserts. If the IOR# signal is asserted, the PCI-PCI bridge 18 generates a PCI I/O cycle to read and store the data from the DMA I/O device 14. The PCI-PCI bridge 18 then writes the stored data out to memory.

ISA Bus Initiated Accesses

A DMA I/O device 14A on the ISA bus 30 asserts its DRQ signal. The PCI-ISA dock bridge 32 translates this signal to a serial packet which is sent to the PCI-PCI bridge 18 over signal line 46. The PCI-PCI bridge 18 decodes the serial packet to an internal DRQ signal. The DMA controllers 20 of the PCI-PCI bridge 18 arbitrates between all DMA requests in the system 10. Once the PCI interfaces transmit their respective grants, an internal grant asserts to the DMA controller 20. The DMA controller 20 then begins a DMA cycle by asserting a DACK# signal.

Upon a DACK# signal assertion, the PCI-PCI bridge 18 presents the encoded state of the DACK#, transfer mode, and the terminal count (TC) signals on the address lines of the PCI bus 14 and asserts a sDAKVLD# signal. The PCI-ISA dock bridge translates the DACK# signal into an ISA DACK# assertion. After the PCI-PCI bridge 18 asserts sDAKVLD#, the PCI-PCI bridge 18 samples sDRQVLD#. The PCI-ISA dock bridge 32 acknowledges its DMA I/O devices's 14A DACK# code by asserting sDRQVLD# within two PCI clock cycles after the sDAKVLD# assertion. The requesting DMA I/O device 14A keeps sDRQVLD# asserted until the requesting ISA DMA I/O device 14A deasserts its DRQ signal. The requesting DMA I/O device 14A deasserts sDRQVLD# before the DMA I/O device 14A asserts TRDY# if the DMA I/O device 14A cannot immediately accommodate another DMA cycle. The DMA I/O device 14A also changes the state of sDRQVLD# in response to sDAKVLD# being driven high.

After the sDRQVLD#/sDAKVLD# handshake, the PCI-PCI bridge 18 samples the states of the DMA controller's 20 I/O read (IOR#) signal and the memory read (MEMR#) signal. If the MEMR# signal is asserted, a PCI memory read cycle begins. The PCI-PCI bridge 18 generates a PCI cycle to read the data from the memory device. The PCI-PCI bridge 18 stores the data and then generates a PCI I/O cycle to write the data to the PCI-ISA dock bridge 32 which translates it into an ISA DMA I/O write cycle to the ISA DMA I/O device 14A. This memory read-I/O write sequence continues until a TC occurs or DRQ from the ISA DMA I/O device 14A deasserts. If the IOR# signal is asserted, the PCI-PCI bridge 18 generates a PCI I/O read cycle which is translated by the PCI-ISA dock bridge 32 to an ISA DMA I/O read cycle and stores the data from the ISA DMA I/O device 14A. The PCI-PCI bridge 18 then writes the stored data out to memory.

The PCI-ISA dock bridge 32 translates the PCI I/O read to an ISA I/O cycle with the signals Address Enabled (AEN) and Bus Address Latch Enabled (BALE) asserted for the entire cycle. The only difference between this cycle and a normal ISA I/O cycle is that the signals AEN, BALE, and a single DACK# signal are asserted. The I/O read data is sent back to the PCI-PCI bridge 18 with a TRDY# signal as in any other normal PCI I/O cycle. The PCI-PCI bridge 18 temporarily stores this data for the subsequent PCI memory write cycle.

The memory cycle executes like any other PCI memory cycle. If the memory cycle is claimed by the PCI-ISA dock bridge 32, the PCI-ISA dock bridge 32 translates the memory cycle to a normal ISA memory cycle except that the DACK# signal remains asserted. When the ISA memory cycle is complete, the PCI-ISA dock bridge 32 sends a TRDY# signal back to the PCI-PCI bridge 18 as in any other PCI cycle. A PCI DMA read cycle executes the same way except that a memory read cycle occurs before an I/O write cycle.

ISA Bus Master Initiated Cycles

An ISA bus master device 38 issues a DMA request on the ISA bus 30 using a DMA channel which has been programmed for Cascade Mode. The PCI-ISA dock bridge 32 detects a master mode PCI DMA acknowledge cycle when the Cascade bit is sampled set when sDAKVLD# asserts and claims ownership of the PCI bus 12 by driving sDRQVLD# active from the PCI-PCI bridge 18. Ownership is held until sDRQVLD# is detected inactive. To allow for PCI bus turn-around, sDRQVLD# is made active two PCI clocks after sDAKVLD# is detected active (one clock for the sDAKVLD# cycle and one for the bus turn-around). The PCI-ISA dock bridge 32 asserts the corresponding DACK# on the ISA bus 30 in the same manner as in a DMA cycle. The ISA bus master device 38 then gains control of the ISA bus 30 by asserting a MASTER# signal. Like DMA cycles, there can be multiple data transfers in Master Mode. An ISA bus master can generate both memory and I/O accesses.

The PCI-ISA dock bridge 32, upon detection of a memory read (MEMR#) signal, a memory write (MEMW#) signal, an I/O read (IOR#) signal or an I/O write (IOW#) signal from the ISA bus master device 38, starts a PCI cycle. The cycles will continue as long as the ISA bus master device 38 asserts its DRQ signal. This DRQ assertion is indicated by a corresponding sDRQVLD# assertion to the DMA controller 20 in the PCI-PCI bridge 18.

While the invention has been particularly shown and described with reference to a preferred embodiment thereof, it should be understood by those skilled in the art that changes in form and detail may be made therein without departing from the spirit and scope of the invention.

What is claimed is:

1. A system for supporting a Direct Memory Access (DMA) Input/Output (I/O) device comprising, in combination:

a Peripheral Component Interconnect (PCI) bus;

peripheral controller means having said DMA I/O device incorporated therein and coupled to said PCI bus for signalling a DMA request from said DMA I/O device;

PCI-PCI bridge means coupled to said peripheral controller means for decoding said DMA request from said DMA I/O device and for initiating PCI bus access for transferring data to and from said DMA I/O device;

Central Processing Unit (CPU) means for programming said PCI-PCI bridge means with information concerning said data transferring; and system controller means coupled to said CPU means and to said peripheral controller means for translating CPU cycles to PCI master cycles.

2. A system for supporting a DMA I/O device in accordance with claim 1 further comprising:

first signal line means coupled to said peripheral controller means and to said PCI-PCI bridge means for signalling said PCI-PCI bridge means when a valid DMA transfer has been requested by said DMA I/O device;

second signal line means coupled to said peripheral controller means and to said PCI-PCI bridge means for signalling said peripheral controller means when said PCI-PCI bridge means acknowledges said valid DMA transfer has been granted; and third signal line means coupled to said peripheral controller means and to said PCI-PCI bridge means for transmitting real time status of a DMA request signal (DRQ) from said DMA I/O device.

3. A system for supporting a DMA I/O device in accordance with claim 1 further comprising:

an Industry Standard Architecture (ISA) bus; and

Peripheral Component Interconnect to Industry Standard Architecture (PCI-ISA) dock bridge means coupled to said PCI-PCI bridge means for forwarding DMA cycles and ISA Master cycles which originate on said ISA bus to said PCI bus.

4. A system for supporting a DMA I/O device in accordance with claim 3 further comprising:

an ISA DMA I/O device coupled to said ISA bus;

first signal line means coupled to said PCI-ISA dock bridge means and to said PCI-PCI bridge means for signalling said PCI-PCI bridge means when a valid DMA transfer has been requested by said ISA device via said PCI-ISA dock bridge means;

second signal line means coupled to said PCI-ISA dock bridge means and to said PCI-PCI bridge means for signalling said PCI-ISA dock bridge means when said PCI-PCI bridge means coupled to said PCI-ISA dock bridge means acknowledges said DMA transfer has been granted; and third signal line means coupled to said PCI-ISA dock bridge means and to said PCI-PCI bridge means for signalling real time status of a DMA request signal (DRQ) from said ISA DMA I/O device.

5. A system for supporting a DMA I/O device in accordance with claim 3 further comprising ISA bus mastering means coupled to said PCI-ISA dock bridge means for issuing a DMA request on said ISA bus.

6. A system for supporting a DMA I/O device comprising, in combination:

a PCI bus;

peripheral controller means having said DMA I/O device incorporated therein and coupled to said PCI bus for signalling a DMA request from said DMA I/O device;

PCI-PCI bridge means coupled to said peripheral controller means for decoding said DMA request from said DMA I/O device and for initiating PCI bus access for transferring data to and from said DMA I/O device;

CPU means for programming said PCI-PCI bridge means with information concerning said data transferring;

system controller means coupled to said CPU means and to said peripheral controller means for translating CPU cycles to PCI master cycles;

first signal line means coupled to said peripheral controller means and to said PCI-PCI bridge means for signalling said PCI-PCI bridge means when a valid DMA transfer has been requested by said DMA I/O device;

second signal line means coupled to said peripheral controller means and to said PCI-PCI bridge means for signalling said peripheral controller means when said PCI-PCI bridge means acknowledges said valid DMA transfer has been granted; third signal line means coupled to said peripheral controller means and to said PCI-PCI bridge means for transmitting real time status of a DMA request signal (DRQ) from said DMA I/O device;

an ISA bus;

an ISA DMA I/O device coupled to said ISA bus;

PCI-ISA dock bridge means coupled to said ISA bus and to said PCI-PCI bridge means for translating PCI cycles to ISA cycles;

first signal line means coupled to said PCI-ISA dock bridge means and to said PCI-PCI bridge means for signalling said PCI-PCI bridge means when a valid DMA transfer has been requested by said ISA DMA I/O device via said PCI-ISA dock bridge means;

second signal line means coupled to said PCI-ISA dock bridge means and to said PCI-PCI bridge means for signalling said PCI-ISA dock bridge means when said PCI-PCI bridge means coupled to said PCI-ISA dock bridge means acknowledges said DMA transfer has been granted;

third signal line means coupled to said PCI-ISA dock bridge means and to said PCI-PCI bridge means for signalling real time status of a DMA request signal (DRQ) from said ISA DMA I/O device; and ISA bus mastering means coupled to said PCI-ISA dock bridge means for issuing a DMA request on said ISA bus.

7. A system for supporting DMA I/O device in accordance with claim 7 wherein said PCI-PCI bridge means comprises programmable DMA controller means for storing said programmed information concerning said transfer of data and for arbitrating between all DMA requests in said system and to designate a PCI bus to use.

8. A method for performing DMA transfers comprising the steps of:

providing a system for supporting a DMA I/O device comprising:
a PCI bus;
peripheral controller means having said DMA I/O device incorporated therein and coupled to said PCI bus for signalling a DMA request from said DMA I/O device;
PCI-PCI bridge means coupled to said peripheral controller means for decoding said PCI bus request from said DMA I/O device and for initiating PCI bus access for transferring data to and from said DMA I/O device;
CPU means for programming said PCI-PCI bridge means with information concerning said data transferring;
system controller means coupled to said CPU means and to said peripheral controller means for translating CPU cycles to PCI master cycles;
first signal line means coupled to said peripheral controller means and to said PCI-PCI bridge means for signalling said PCI-PCI bridge means when a valid DMA transfer has been requested by said DMA I/O device;
second signal line means coupled to said peripheral controller means and to said PCI-PCI bridge means for signalling said peripheral controller means when said PCI-PCI bridge means acknowledges said valid DMA transfer has been granted; and
third signal line means coupled to said peripheral controller means and to said PCI-PCI bridge means for transmitting real time status of a DMA request signal (DRQ) from said DMA I/O device;

programming said PCI-PCI bridge means by said CPU with said information concerning said transfer of data;

signalling said PCI-PCI bridge means when said valid DMA transfer has been requested by said DMA I/O device;

signalling said peripheral controller means when said PCI-PCI bridge means acknowledges said valid DMA transfer has been granted;

signalling said PCI-PCI bridge means a current status of a DMA request signal (DRQ) from said DMA device; and transferring said data.

9. The method of claim 8 wherein said step of programming said PCI-PCI bridge means by said CPU with said information concerning said transfer of data further comprises the steps of:

programming said PCI-PCI bridge means of an address where said data to be transferred is located;

programming said PCI-PCI bridge means of a size of said data to be transferred;

programming said PCI-PCI bridge means of a direction said data is to be transferred; and programming said PCI-PCI bridge means of a mode said data is to be transferred.

10. The method of claim 8 wherein said step of transferring data further comprises the steps of:

executing by said PCI-PCI bridge means a PCI memory read cycle; and executing by said PCI-PCI bridge means a PCI I/O write cycle.

11. The method of claim 8 wherein said step of transferring data further comprises the steps of:

executing by said PCI-PCI bridge means a PCI I/O read cycle; and executing by said PCI-PCI bridge means a PCI memory write cycle.

12. The method of claim 8 wherein said step of providing a system for supporting a DMA I/O device further comprises the steps of:

providing an ISA bus;

providing an ISA DMA I/O device coupled to said ISA bus;

providing PCI-ISA dock bridge means coupled to said ISA bus and to said PCI-PCI bridge means for translating PCI to ISA cycles on said ISA bus to said PCI bus;

providing first signal line means coupled to said PCI-ISA dock bridge means and to said PCI-PCI bridge means for signalling said PCI-PCI bridge means when a valid DMA transfer has been requested by said ISA DMA I/O device coupled to said ISA bus; and providing second signal line means coupled to said PCI-ISA dock bridge means and to said PCI-PCI bridge means for signalling said PCI-ISA dock bridge means when said PCI-PCI bridge means acknowledges said DMA transfer has been granted.

13. The method of claim 12 wherein said step of transferring data further comprises the steps of:

executing by said PCI-PCI bridge means a PCI memory read cycle;

executing by said PCI-PCI bridge means a PCI I/O write cycle; and converting by said PCI-ISA dock bridge means said PCI I/O write cycle into a standard DMA cycle on said ISA bus.

14. The method of claim 12 wherein said step of transferring data further comprises the steps of:

executing by said PCI-PCI bridge means said PCI I/O read cycle;

converting by said PCI-ISA dock bridge means said PCI I/O read cycle into a standard DMA cycle on said ISA bus; and executing by said PCI-PCI bridge means a PCI memory write cycle.

* * * * *

UNITED STATES PATENT AND TRADEMARK OFFICE
CERTIFICATE OF CORRECTION

PATENT NO. : 5,968,144

DATED : October 19, 1999

INVENTOR(S) : Walker et al.

It is certified that error appears in the above-identified patent and that said Letters Patent is hereby corrected as shown below:

Col. 8, line 67: "claim 7" should read --claim 6--.

Signed and Sealed this

Twentieth Day of February, 2001

Attest:

NICHOLAS P. GODICI

Attesting Officer

Acting Director of the United States Patent and Trademark Office